United States Patent
Miyagawa et al.

[11] Patent Number: 6,120,828
[45] Date of Patent: Sep. 19, 2000

[54] METHOD FOR FREEZING BOILED RICE IN SEPARATE SMALL-LUMP FORM

[75] Inventors: Tomoyuki Miyagawa; Yoshio Ishii; Takashi Tanaka, all of Tokyo, Japan

[73] Assignee: Howa Sangyo Co., Ltd., Tokyo, Japan

[21] Appl. No.: 09/134,438

[22] Filed: Aug. 14, 1998

[51] Int. Cl.[7] .................................................... A23L 3/00
[52] U.S. Cl. ............................................. 426/524; 62/63
[58] Field of Search ..................................... 426/524, 518; 62/63, 65, 380

[56] References Cited

U.S. PATENT DOCUMENTS

| | | | |
|---|---|---|---|
| 4,281,521 | 8/1981 | Martin et al. | 62/380 |
| 4,607,495 | 8/1986 | Fujimoto | 426/524 |

FOREIGN PATENT DOCUMENTS

| | | |
|---|---|---|
| 57-99148 | 6/1982 | Japan . |
| 60-227644 | 11/1985 | Japan . |
| 63-44857 | 2/1988 | Japan . |
| 2-9352 | 1/1990 | Japan . |
| 8-103232 | 4/1996 | Japan . |
| 8-205796 | 8/1996 | Japan . |

OTHER PUBLICATIONS

"Rice Cooking Techniques and Their Applications", edited by Hiroaki Horigome, Kogyo Gijutsukai K.K., pp. 209–225 (1990).

*Primary Examiner*—George C. Yeung
*Attorney, Agent, or Firm*—Armstrong, Westerman, Hattori, McLeland & Naughton

[57] ABSTRACT

To provide an apparatus for producing frozen cooked-rice in an appropriately individuated state without needing complicated and special apparatus constructions, and without breaking down the individual grains of rice, cooked rice is primary-frozen as an entire block by cold air blown from air blast supply devices into the state where the individual grains of rice are not frozen up to their cores. The cooked-rice thus partly primary-frozen is brought by compressed cold air blown by a compressed-cold-air intermittent supply tube and/or by a rotary disjointing device comprising a rotary comb and a stationary comb into the form of appropriate-size blocks or small lumps which are then secondary-frozen by cold air blown from air blast supply devices into a state where the individual grains of rice are frozen completely up to their cores.

5 Claims, 1 Drawing Sheet

METHOD FOR FREEZING BOILED RICE IN SEPARATE SMALL-LUMP FORM

TECHNICAL FIELD

The present invention relates a method and apparatus which are used in a process of freezing cooked rice for individuated freezing of rice cooked on an endless conveyor belt.

BACKGROUND ART

With recent remarkable widespread use of frozen food and technical innovation in the freezing field, frozen cooked-rice has also been commercialized which is prepared by freezing cooked rice, is preserved in a frozen state, and is thawed and heated, if necessary, when eaten. In the past, frozen cooked-rice was mainly in the form of a block enclosed in a container or bag. The frozen cooked-rice in the block form however had such disadvantages that a long time was required for thawing because heat was hard to penetrate the frozen block, and that the taste was spoiled because the thawed cooked-rice was less loosened and the individual grains of rice were likely to break down. Techniques for individually freezing cooked rice have been developed since then as an approach for overcoming those disadvantages, and are generally called IQF (individuated quick freezing). Various proposals for the techniques for individually freezing cooked rice have been made so far.

Typical methods practiced in individuated freezing apparatus for cooked rice on industrial scale are mainly divided into three types below (as described in "Rice Cooking Techniques and Their Applications", edited by Hiroaki Horigome, Kogyo Gijutsukai K. K., pp. 209–225 (1990)).

(1) A method of freezing cooked rice in liquefied coolant gas, such as liquid nitrogen, and dry ice while agitating the cooked rice.

This method can provide good products in both points of individuation and freezing, but it is disadvantageous in pushing up the cost.

(2) A method of freezing cooked rice in the form of masses of cooked rice and disintegrating the masses.

This method is disadvantageous in that the individual grains of rice are likely to break down at the same time as when the masses of cooked rice are disintegrated individually.

(3) A method of freezing cooked rice while loosening it by a combination of the so-called air blasting, in which cooled air is blown to cooked rice, and a rotary comb, or a combination of vibration and a rotary comb.

The last method has been mainly used in the industrial field and various improvements have been proposed in recent years.

Generally, conditions for individuated freezing of cooked rice are set such that the temperature in a freezing apparatus is around −40 to −45° C., the freezing time is about 3 to 5 minutes, and the freezing finish temperature is under −20° C.

As the above method (3) for individually freezing cooked in air blasting, there are proposed, e.g., a process for individually freezing cooked rice by repeating a combination of carrying under vibration and falling ["Freezing and Individuating Apparatus for Cooked Rice" (Japanese Unexamined Patent Publication No. Sho 57-99148)], and a process for individually quickly freezing cooked rice by loosening the cooked rice while it is moved in a meshed rotary drum ["Drum Apparatus for Individuating Cooked Rice" (Japanese Unexamined Patent Publication No. Sho 63-44857)]. However, the above processes are disadvantageous in that the apparatus have complicated and special constructions.

A process for individually freezing cooked rice by using a belt conveyor as feed means and rotating a rotary comb in air blasting is advantageous in that the belt conveyor used as the feed means has versatility and is easy to carry out cleaning and maintenance service.

(3-1) "Freezing and Individuating Method and Apparatus for Cooked Rice" (Japanese Unexamined Patent Publication No. Sho 60-227644)

Above a conveyor for carrying cooked rice placed thereon in the form of a layer while cooling and freezing the cooked rice, there is provided a fixed comb combined with a rotary comb such that comb teeth of the fixed comb mesh with comb teeth of the rotary comb. With this combination, the cooked rice is individuated by actions of impact force and shearing force caused upon meshing of the rotary comb and the fixed comb. According to the disclosure of the Publication, it is particularly possible to promote individuation of the cooked rice into separate grains.

However, this method and apparatus have such a drawback that if the cooked rice is individuated only by actions of impact force and shearing force caused upon meshing of the rotary comb and the fixed comb as disclosed in the Publication, the grains of rice would be subject to an excessive load and would be more likely to break down.

(3-2) "Loosening and Conveying Apparatus for Cooked Rice" (Japanese Unexamined Patent Publication No. Hei 2-9352)

This conveying apparatus comprises a primary freezing conveyor for carrying cooked rice, and a secondary freezing conveyor disposed downstream of the primary freezing conveyor to run from a position lower than it by a step in overlapping relation. A rotary loosening device is provided at a position where the cooked rice falls down from the primary freezing conveyor to the secondary freezing conveyor. According to the disclosure of the Publication, palatable frozen cooked-rice can be produced.

However, this conveying apparatus has such a drawback that the cooked rice cannot be individuated sufficiently only by a combination of natural falling of the cooked rice and the rotary loosening device as disclosed in the Publication.

(3-3) "Individuated Freezing of Cooked Rice" (Japanese Unexamined Patent Publication No. Hei 8-103232).

Cold air is blown to cooked rice from a plurality of jet nozzles disposed above and below a conveyor's carrying surface in opposed relation so that water on the surfaces of individual grains of rice is quickly frozen without freezing the cores of individual grains of rice. Resulting frozen blocks of the cooked rice are then disintegrated for individuation. According to the disclosure of the Publication, the grains of rice are less likely to break down.

However, providing a plurality of jet nozzles above and below the conveyor's carrying surface in opposed relation, as disclosed in the Publication, is disadvantageous in making the apparatus construction complicated.

(3-4) "Freezing and Individuating Method and Apparatus for Cooked Rice" (Japanese Unexamined Patent Publication No. Hei 8-205796).

Frozen blocks of cooked rice are divided into small pieces, and the small pieces are sent to a plurality of rotary combs for individuation of the frozen cooked-rice. The rotary combs are provided side by side in the carrying direction and are rotated at progressively increasing rotational speeds. According to the disclosure of the Publication, the frozen cooked-rice can be smoothly disintegrated and individuated without breaking down the individual grains of rice.

However, providing a plurality of rotary combs side by side in the direction of running of the conveyor, as disclosed in the Publication, is disadvantageous in making the apparatus construction complicated.

SUMMARY OF THE INVENTION

An object of the present invention is to provide a method and apparatus for producing frozen cooked-rice in an appropriately individuated state without needing complicated and special apparatus constructions, and without breaking down the individual grains of rice.

The present invention has been accomplished based on the finding as follows. In the conventional techniques, because it has been attempted to individuate frozen cooked-rice perfectly into individual grains of rice, apparatus with complicated or special constructions are required. Also, the cooked rice frozen and individuated perfectly into individual grains of rice is apt to deteriorate during preservation in a frozen state. As a result of studying those problems, the inventors have found that, by individuating the frozen cooked-rice not perfectly, i.e., by stopping individuation of the frozen cooked-rice in the form of small lumps, improvements are achieved in all points of handling of the frozen cooked-rice, resistance against deterioration of the cooked rice in a frozen state, uniformity in thawing, and the feel and taste in eating of the cooked-rice after thawing.

Further, the conventional techniques have had such a drawback that satisfactory individuation of the frozen cooked-rice cannot be achieved with the simple apparatus constructions.

Another object of the present invention is to produce frozen cooked-rice in an appropriately individuated state by combining simple apparatus with each other without complicating the apparatus construction.

To achieve the above objects, the present invention is featured in that, in an individuated freezing process for cooked rice using cold air blast, a feed means having versatility and being easy to carry out cleaning and maintenance service, e.g., an endless conveyor belt such as a belt conveyor and caterpillar conveyor, is combined with a rotary comb and a compressed-cold-air intermittent ejection nozzle, which simple in structure, to produce frozen cooked-rice in an appropriately individuated state without complicating apparatus construction and without breaking down the individual grains of rice.

An individuated freezing method for cooked rice according to the present invention comprises the steps of freezing cooked rice into the form of blocks in which the surfaces of individual grains of rice are frozen, but the cores of individual grains of rice are not frozen, disjointing the blocks of partly frozen cooked-rice for separation into the form of small lumps, and then freezing the partly frozen cooked-rice in the form of small lumps completely up to the cores of individual grains of rice. The blocks of the partly frozen cooked-rice are preferably formed by intermittent ejection of compressed cold air to the partly frozen cooked-rice. Also, preferably, the blocks of the partly frozen cooked-rice are disjointed for separation into the form of small lumps by disjointing means.

More specifically, the individuated freezing method for cooked rice according to the present invention comprises the steps of primary-freezing cooked rice, that is supplied onto a carrying surface of an endless conveyor belt for primary freezing, into a state where the surfaces of individual grains of rice are frozen, but the cores of individual grains of rice are not frozen, ejecting compressed cold air intermittently from below the carrying surface when the partly frozen cooked-rice is carried to the downstream end of the carrying surface for primary freezing, so that the partly frozen cooked-rice is brought into the form of blocks each having an appropriate size, disjointing the blocks of the partly frozen cooked-rice by disjointing means for separation into the form of small lumps, supplying the partly frozen cooked-rice in the form of small lumps onto a carrying surface of an endless conveyor belt for secondary freezing, and secondary-freezing the partly frozen cooked-rice completely up to the cores of individual grains of rice while the small lumps of the cooked rice are carried on the carrying surface. Preferably, the blocks of the frozen cooked-rice fall down from the carrying surface of the endless conveyor belt for primary freezing into a rotary disjointing device, and are disjointed for separation into the form of small lumps by a combination of a rotary comb and a stationary comb.

An individuated freezing apparatus for cooked rice according to the present invention comprises an air-permeable endless conveyor belt for primary freezing of cooked rice placed thereon, an air-permeable endless conveyor belt for secondary freezing of the cooked rice placed thereon which is disposed downstream of the upstream endless conveyor belt to run from a position lower than it by a step in overlapping relation, a compressed-cold-air intermittent supply tube disposed at a position near the downstream end of the endless conveyor belt in the direction of running thereof for blowing compressed cold air toward a carrying surface of the upstream endless conveyor belt, a rotary disjointing device disposed at a position where the cooked rice falls down from the upstream endless conveyor belt to the downstream endless conveyor belt, and air blast supply devices disposed on the rear side of the carrying surfaces of the upstream endless conveyor belt for primary freezing and the downstream endless conveyor belt for secondary freezing, whereby the cooked rice is finally frozen in the form of separate small lumps.

With the individuated freezing method and apparatus for cooked rice according to the present invention, the cooked rice is placed on the upstream air-permeable endless conveyor belt and primary-frozen as an entire block by cold air blown from air blast supply devices, which are disposed on the rear side of a carrying surface of the upstream endless conveyor belt, into a state where the individual grains of rice are not frozen their cores. The cooked rice thus partly primary-frozen is brought into the form of appropriate-size blocks by compressed cold air blown from a compressed-cold-air intermittent supply tube, which is disposed at a position near the downstream end of the upstream endless conveyor belt in the direction of running thereof, toward the carrying surface thereof from below. The appropriate-size blocks of partly frozen cooked-rice are each disjointed for separation into the form of small lumps by a rotary disjointing device disposed at a position where the cooked rice falls down from the upstream endless conveyor belt to an air-permeable endless conveyorbelt for secondary freezing of the cooked rice placed thereon which is disposed downstream of the upstream endless conveyor belt to run from a position lower than it by a step in overlapping relation. The partly frozen cooked-rice in the form of small lumps are then placed on the downstream endless conveyor belt and secondary-frozen by cold air blown from air blast supply devices, which are disposed on the rear side of a carrying surface of the endless conveyor belt, into a state where the individual grains of rice are frozen completely up to their cores.

Thus, the compressed cold air from the compressed-cold-air intermittent supply tube is blown to an entire block of the partly frozen cooked-rice in a state where the cores of individual grains of rice are not yet frozen, thereby forming appropriate-size blocks of the partly frozen cooked-rice. The appropriate-size blocks of the partly frozen cooked-rice are each then disjointed for separation into the form of small lumps by the rotary disjointing device, followed by being frozen completely up to the cores of individual grains of rice.

DETAILED DESCRIPTION OF PREFERRED EMBODIMENT

Figure 1:
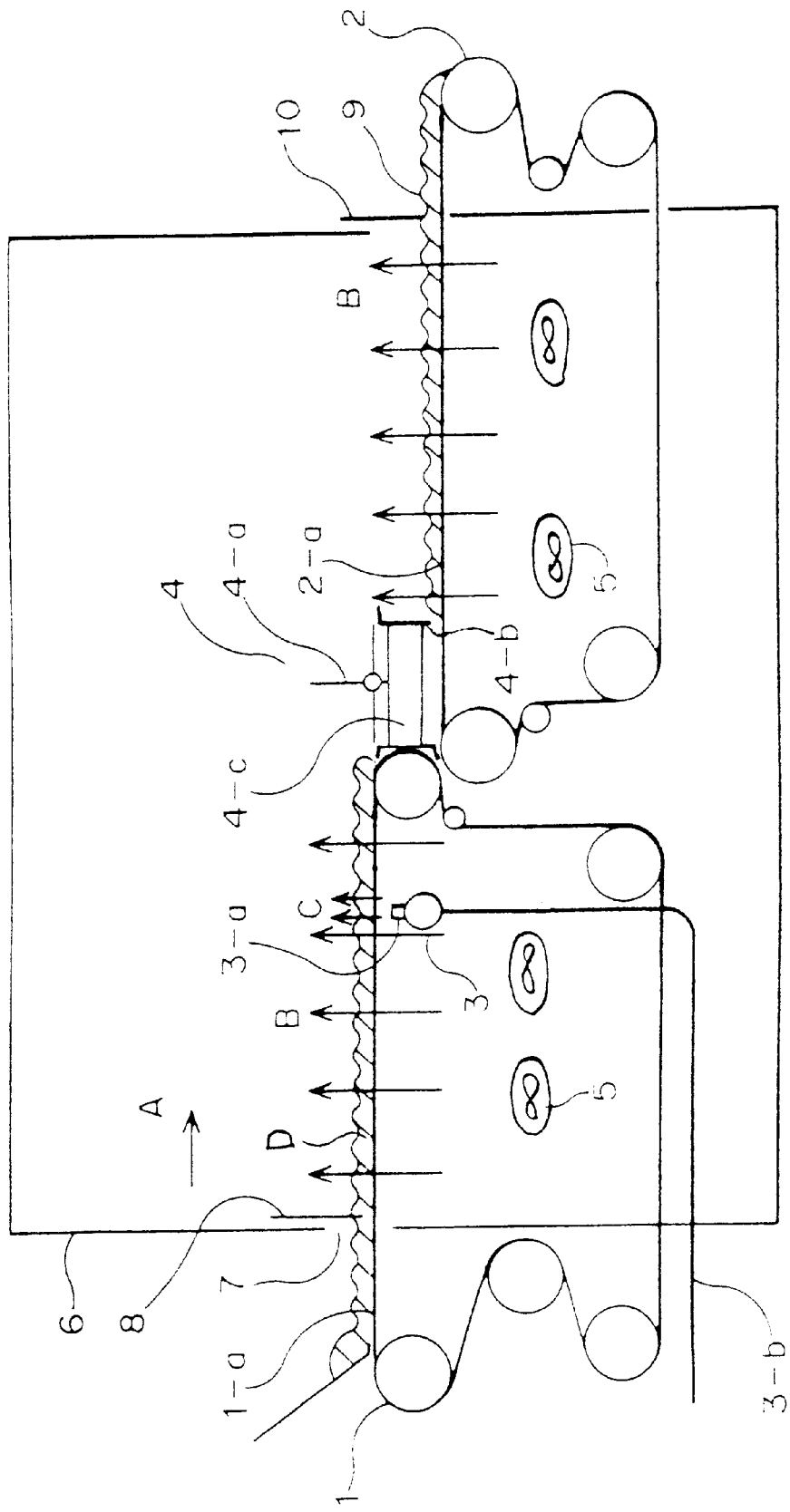
FIG. 1 is a schematic view for explaining an individuated freezing method and apparatus for cooked rice.

The present invention will be described below in more detail in conjunction with a preferred embodiment.

As shown in FIG. 1, a line for carrying cooked rice comprises an air-permeable endless conveyor belt 1 for primary freezing, an air-permeable endless conveyor belt 2 for secondary freezing which is disposed downstream of the endless conveyor belt 1 to run from a position lower than it by a step in overlapping relation, a compressed-cold-air intermittent supply tube 3 disposed on the rear side of, i.e., below, a carrying surface of the endless conveyor belt 1 for primary freezing at a position near the downstream end in the direction (arrow A) of running of the endless conveyor belt 1, a rotary disjointing device 4 disposed at a position where the cooked rice falls down from the endless conveyor belt 1 for primary freezing to the endless conveyor belt 2 for secondary freezing, and air blast supply devices (fans) 5 disposed on the rear side of carrying surfaces 1-a, 2-a of the endless conveyor belt 1 for primary freezing and the conveyor belt 2 for secondary freezing.

The endless conveyor belts 1, 2 each comprise a resinor metal-made conveyor belt having a large number of pores which are formed in the carrying surface 1-a, 2-a in a uniform pattern and has a size enough to allow cooling air-blast to penetrate the belt evenly, but to block grains of rice from passing through the belt. The conveyor belt is usually made of ethylenetetrafluoride (trade name: Teflon).

The line for carrying cooked rice is entirely covered by a heat insulating housing 6 in the form like a room except entrance and exit portions through which the cooked rice is supplied and discharged, respectively. The air blast is evenly blown to the carrying surfaces 1-a, 2-a of the endless conveyor belts 1, 2 from below upward (arrows B), and is collected into a cooler disposed within the housing 6 on the opposite side of the carrying line to the air blast supply devices 5. Then, the cooled air blast is blown again to the carrying surfaces 1-a, 2-a.

In the entrance portion through which the cooked rice is supplied, the endless conveyor belt 1 for primary freezing is partly projected of the housing 6. The cooked rice supplied to there is introduced to the inside of the housing 6 through an entrance 7 in the form of an opening formed in the housing 6. A shut-off plate 8 capable of tilting in the direction of running of the belt is attached to the entrance 7 so that cold air is moderately shut off from leaking out of the housing 6.

In the exit portion through which the cooked rice is discharged, the endless conveyor belt 2 for secondary freezing is partly projected of the housing 6. The cooked rice having reached there is carried to the outside of the housing 6 through an exit 9 in the form of an opening formed in the housing 6. A shut-off plate 10 capable of tilting in the direction of running of the belt is attached to the exit 9 so that cold air is moderately shut off from leaking out of the housing 6.

The shut-off plates 8, 10 may be formed of a metal or resin.

The compressed-cold-air intermittent supply tube 3 is disposed close to the underside of the carrying surface of the endless conveyor belt 1 at a position near the downstream end of the endless conveyor belt 1, and is transversely extended with respect to the direction of running of the endless conveyor belt 1 over a distance almost equal to the belt width. The compressed-cold-air intermittent supply tube 3 has a plurality of nozzles 3-a for ejecting compressed cold air right above (arrows C), the nozzles being arranged with predetermined intervals (not shown) in the transverse direction. Compressed cold air is intermittently ejected from the nozzles 3-a toward the carrying surface 1-a.

A pressure hose 3-b for supplying compressed cold air to the supply tube 3 is arranged inside the housing 6 over a long distance. Compressed air supplied from a compressor (not shown), which is installed outside the housing 6, is cooled while flowing through the pressure hose 3-b, and then ejected as compressed cold air from the compressed-cold-air intermittent supply tube 3.

The rotary disjointing device 4 is provided at a position where the cooked rice falls down from the endless conveyor belt 1 for primary freezing to the endless conveyor belt 2 for secondary freezing. The rotary disjointing device 4 comprises a combination of a rotary comb 4-a having a plurality of teeth, a pair of support plates 4-b disposed vertically to the carrying surface 2-a in opposed relation and serving to fix a stationary comb 4-c in place, and the stationary comb 4-c supported by the pair of opposing support plates 4-b so as to mesh with the rotary comb 4-a rotating between the support plates 4-b.

The rotating comb 4-a, the support plates 4-b and the stationary comb 4-c can be made of a metal or resin, but they are usually made of stainless steel. Ethylenetetrafluoride (trade name: Teflon) may also be used partly in each of those components.

Operation

Cooked rice D cooled down below the room temperature is supplied to the carrying surface 1-a for primary freezing in the form of a layer or block, and then carried into the housing 6 through the entrance 7 while pushing the shut-off plate 8 downward.

Cold air supplied from the air blast supply fans 5 is blown through the carrying surface 1-a for primary freezing from below upward (arrows B) so that the surfaces of individual grains of rice are frozen, but the cores of individual grains of rice are not frozen.

When the cooked rice thus partly frozen is carried to the downstream end of the carrying surface 1-a for primary freezing, compressed cold air is intermittently ejected (arrows C) toward the cooked rice from the compressed-cold-air intermittent supply tube 3 disposed under the carrying surface 1-a. Upon receiving impacts applied from the compressed cold air, the cooked rice D is pushed up from below and is brought into the form of blocks each having an appropriate size.

The cooked rice D, which has been frozen at the grain surfaces and brought into the form of blocks each having an appropriate size, falls down from the carrying surface 1-a of the endless conveyor belt 1 for primary freezing into the rotary disjointing device 4. The block-like cooked rice D is placed on the stationary comb 4-*c* and then individuated to an appropriate extent under impact force applied from the rotary comb 4-*a*.

The individuated cooked-rice is scraped out from a space defined by the support plates 4-*b* to rest on the carrying surface 2-*a* of the endless conveyor belt 2 for secondary freezing. While the individuated cooked-rice is carried on the carrying surface 2-*a*, the individual grains of rice are completely frozen up to their cores with cold air that is supplied from the air blast supply fans 5 to blow through the carrying surface 2-*a* from below upward (arrows B). The individuated cooked-rice D thus frozen is carried out of the housing 6 through the exit 9 while pushing the shut-off plate 10 downward.

It is to be noted that in the stage of the rotating disjointing device 4, because the cooked rice D is not frozen up to the cores of individual grains of rice, each block of the cooked rice is easily disjointed by moderate impact force applied from the rotary disjointing device 4 so that it is individuated into the form of small lumps having an appropriate size.

Also, because the cooked rice D is brought into the form of blocks each having an appropriate size upon receiving impacts applied from the compressed cold air, the impact force applied from the rotary disjointing device for disintegration of the frozen rice block is required only at such a moderate level as not breaking down the individual grains of rice.

Further, the extent of individuation of the cooked rice can be adjusted by regulating the intensity of impacts or impact force applied by the compressed cold air supplied from the compressed-cold-air intermittent supply tube 3 and the rotary disjointing device 4.

In the case of cooking white rice (rice cooked using only polished rice) and rice with assorted mixtures, in particular, by stopping individuation of the frozen cooked-rice in the form of small lumps having a size not larger than 1 inch (2.54 cm) without perfectly individuating it into individual grains of rice, improvements are achieved in all points of handling of the frozen cooked-rice for weighing, packaging into bags, etc., stability against deterioration of the cooked rice in a frozen state, uniformity in thawing, and the feel and taste in eating of the cooked-rice after thawing.

What is claimed is:

1. A freezing method for cooked rice, comprising the steps of freezing cooked rice so as to form blocks of partly frozen cooked-rice in which the surfaces of individual grains of rice are frozen, but the cores of individual grains of rice are not frozen, disjointing the blocks of partly frozen cooked-rice for separation into the form of small lumps, and then freezing the partly frozen cooked-rice in the form of small lumps completely up to the cores of individual grains of rice.

2. The freezing method for cooked rice according to claim 1, wherein said blocks of the partly frozen cooked-rice are formed by intermittent ejection of compressed cold air to the partly frozen cooked-rice.

3. The freezing method for cooked rice according to claim 1, wherein said blocks of the partly frozen cooked-rice are disjointed for separation into the form of small lumps by disjointing means.

4. A freezing method for cooked rice, comprising the steps of primary-freezing cooked rice, that is supplied onto a carrying surface of an endless conveyor belt for primary freezing, into partly frozen cooked-rice which is in a state where the surfaces of individual grains of rice are frozen, but the cores of individual grains of rice are not frozen, ejecting compressed cold air intermittently from below said carrying surface when the partly frozen cooked-rice is carried to a downstream end of said carrying surface for primary freezing, so that the partly frozen cooked-rice is brought in the form of blocks of partly frozen cooked-rice each having an appropriate size, disjointing the blocks of partly frozen cooked-rice by disjointing means for separation in the form of small lumps, supplying the partly frozen cooked-rice in the form of small lumps onto a carrying surface of an endless conveyor belt for secondary freezing, and secondary-freezing the partly frozen cooked-rice completely up to the cores of individual grains of rice while the lumps of the cooked rice are carried on the carrying surface.

5. The freezing method for cooked rice according to claim 4, wherein said blocks of the partly frozen cooked-rice fall down from the carrying surface of the endless conveyor belt for primary freezing into a rotary disjointing device, and are disjointed for separation in the form of small lumps by a combination of a rotary comb and a stationary comb.

* * * * *

UNITED STATES PATENT AND TRADEMARK OFFICE
CERTIFICATE OF CORRECTION

PATENT NO.: 6,120,828
DATED : September 19, 2000
INVENTOR(S): MIYAGAWA et al.

It is certified that an error appears in the above-identified patent and that said Letters Patent is hereby corrected as shown below:

On the title page of the patent in item [73] change the assignees name, "Howa Sangyo Co., Ltd." to be --Showa Sangyo Co., Ltd.--

Signed and Sealed this

Fifteenth Day of May, 2001

*Attest:*

NICHOLAS P. GODICI

*Attesting Officer*    *Acting Director of the United States Patent and Trademark Office*